United States Patent
Koyama et al.

(10) Patent No.: US 10,848,897 B2
(45) Date of Patent: Nov. 24, 2020

(54) ACOUSTIC PROCESSING DEVICE, ACOUSTIC PROCESSING METHOD, AND RECORDING MEDIUM

(71) Applicant: Panasonic Intellectual Property Management Co., Ltd., Osaka (JP)

(72) Inventors: Yasuhiro Koyama, Kanagawa (JP); Takashi Nakanishi, Kanagawa (JP); Hiroshi Tsukamoto, Tokyo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/576,875

(22) Filed: Sep. 20, 2019

(65) Prior Publication Data
US 2020/0015029 A1    Jan. 9, 2020

Related U.S. Application Data

(63) Continuation of application No. PCT/JP2018/005646, filed on Feb. 19, 2018.

(30) Foreign Application Priority Data

Mar. 29, 2017   (JP) ................................ 2017-064826

(51) Int. Cl.
*H04S 7/00* (2006.01)
*B60R 11/02* (2006.01)
*B60R 11/00* (2006.01)

(52) U.S. Cl.
CPC .......... *H04S 7/303* (2013.01); *B60R 11/0217* (2013.01); *H04S 7/305* (2013.01); *H04S 7/307* (2013.01); *B60R 2011/0012* (2013.01)

(58) Field of Classification Search
CPC .......... H04S 7/303; H04S 7/305; H04S 7/307; B60R 11/0217; B60R 2011/0012
See application file for complete search history.

(56) References Cited

U.S. PATENT DOCUMENTS

| | | | |
|---|---|---|---|
| 10,063,971 B2 * | 8/2018 | Hartung | .................. G10L 25/78 |
| 2007/0288110 A1 * | 12/2007 | Inoue | ........................ H04S 3/00 |
| | | | 700/94 |

(Continued)

FOREIGN PATENT DOCUMENTS

| | | |
|---|---|---|
| JP | 61-127299 | 6/1986 |
| JP | 2002-264732 | 9/2002 |

(Continued)

OTHER PUBLICATIONS

International Search Report of PCT application No. PCT/JP2018/005646 dated Apr. 24, 2018.

*Primary Examiner* — Andrew L Sniezek
(74) *Attorney, Agent, or Firm* — Greenblum & Bernstein, P.L.C.

(57) ABSTRACT

An acoustic processing device performs acoustic processing in a space having a first listening position and a second listening position apart from the first listening position. The acoustic processing device includes a first input unit, a first output unit, and a signal processing circuit. The first input unit receives a first sound source signal to be reproduced at the first listening position. The first sound source signal includes a first left-channel signal and a first right-channel signal. The first output unit outputs the first sound source signal to a first speaker group including a first speaker disposed near a place of a head of a listener at the first listening position. The signal processing circuit draws out a first common signal common to both the first left-channel (Continued)

signal and the first right-channel signal and outputs the first common signal to the first speaker.

10 Claims, 5 Drawing Sheets

(56) References Cited

U.S. PATENT DOCUMENTS

2009/0279706 A1    11/2009  Takashima
2019/0239013 A1*    8/2019  Audfray .................. H04S 3/002

FOREIGN PATENT DOCUMENTS

| JP | 2008-067087 | 3/2008 |
| JP | 2008-203716 | 9/2008 |
| JP | 2009-272849 | 11/2009 |
| JP | 2010-006227 | 1/2010 |
| JP | 2013-211625 | 10/2013 |
| JP | 2014-165569 | 9/2014 |

\* cited by examiner

FIG. 4
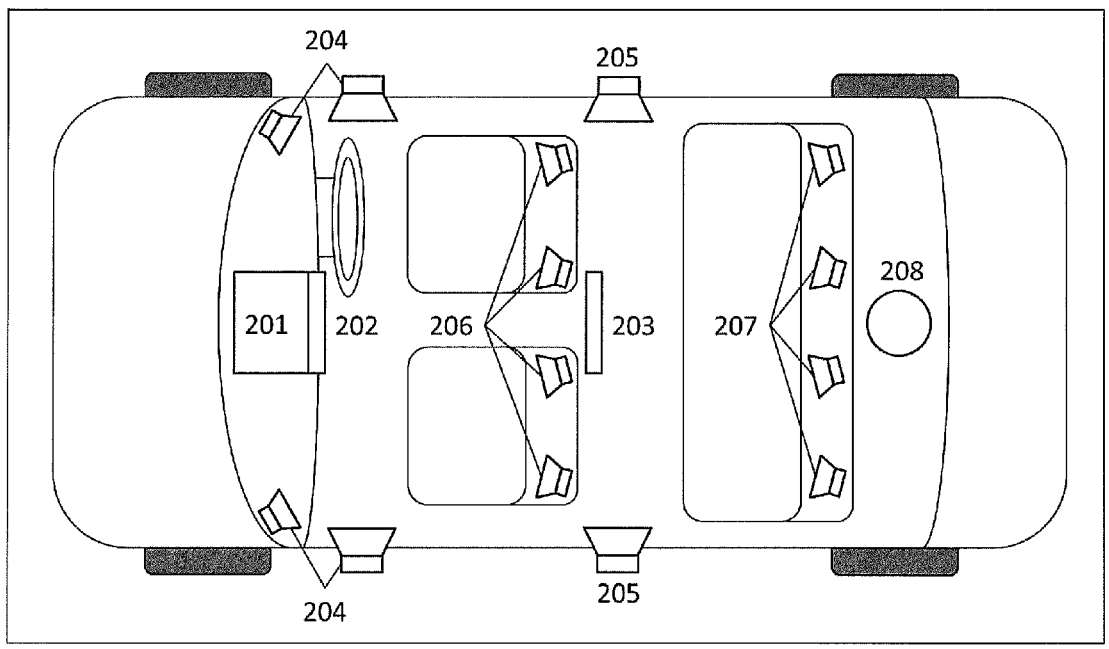
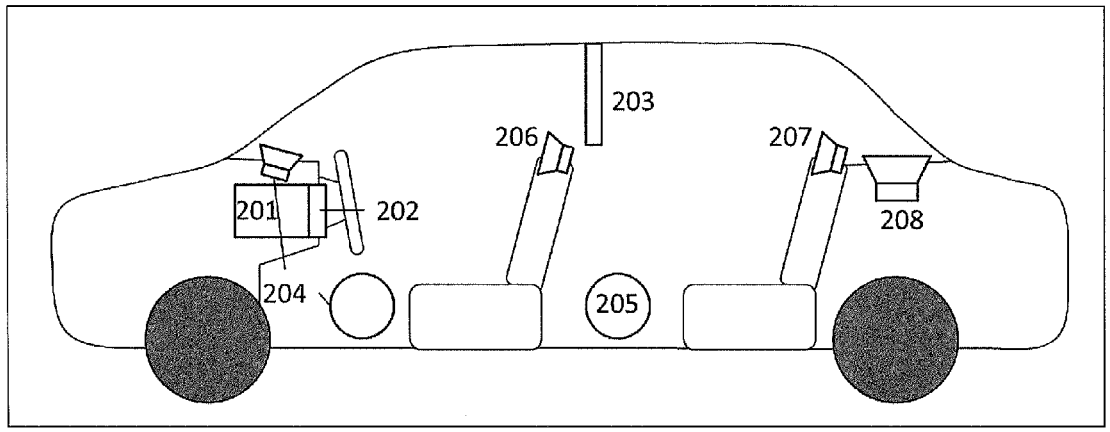

FIG. 5
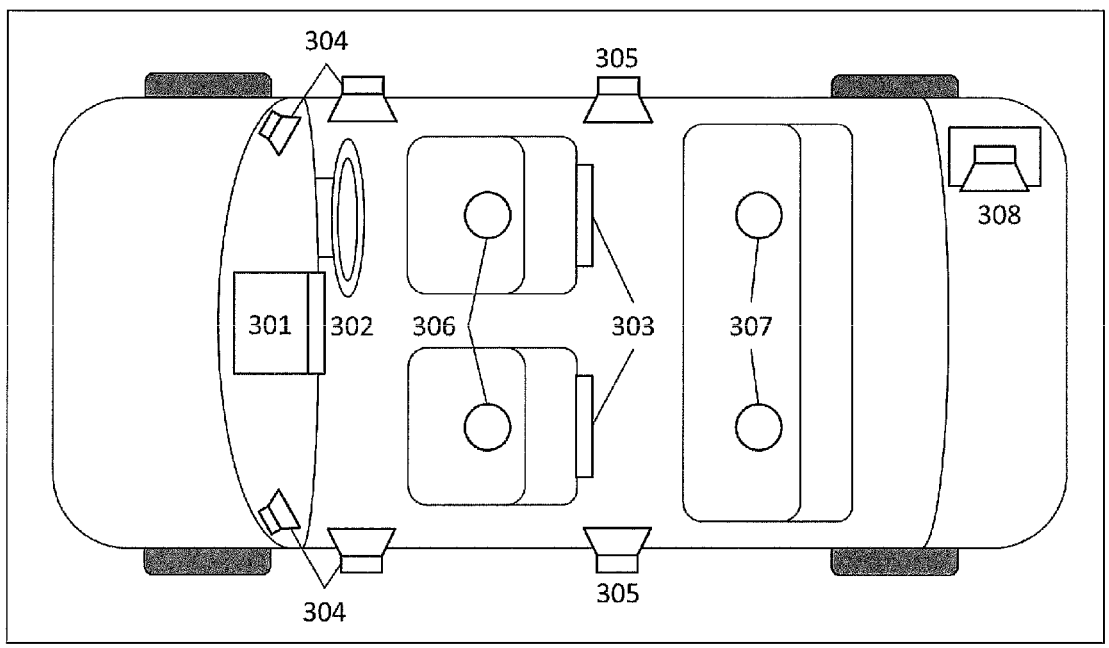
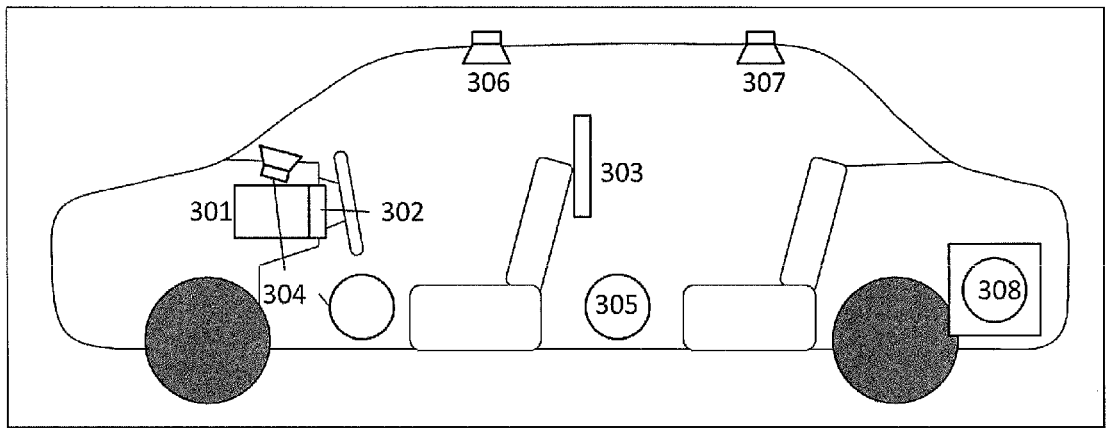

ACOUSTIC PROCESSING DEVICE, ACOUSTIC PROCESSING METHOD, AND RECORDING MEDIUM

TECHNICAL FIELD

The present disclosure relates to an acoustic processing device used to improve audibility of a sound source played in a vehicle cabin or another space where a plurality of listening positions exists.

BACKGROUND ART

It is known that when different sound sources are simultaneously heard in a plurality of areas in a cabin of a vehicle or a movable body, a conventional in-vehicle acoustic processing device reproduces signals of the sound source for front seats from a front-seat front speaker and a front-seat headrest speaker and signals of the sound source for rear seats from a rear-seat rear speaker and a rear-seat headrest speaker. The in-vehicle acoustic processing device attenuates the signals from the sound sources for the front- and rear-seats at high frequencies and low frequencies and outputs the sound signals to allow satisfactory listening of sounds in the respective areas (for example, see PTL 1).

It is known that another conventional in-vehicle acoustic processing device outputs sound signals attenuated at high frequencies and low frequencies from a front-seat headrest speaker and sound signals attenuated at midrange frequencies from a front speaker, as well as outputs sound signals attenuated at high frequencies and low frequencies from a rear-seat headrest speaker and sound signals attenuated at midrange frequencies from a rear speaker (for example, see PTL 2).

CITATION LIST

Patent Literature

PTL 1: Unexamined Japanese Patent Publication No. 2002-264732
PTL 2: Unexamined Japanese Patent Publication No. 2014-165569

SUMMARY OF THE INVENTION

The present disclosure provides an acoustic processing device that is used in a space where a plurality of listening positions exists and that enables a listener at each of the listening positions to listen to sound in a more satisfactory environment.

An acoustic processing device according to the present disclosure performs acoustic processing in a space having a first listening position and a second listening position apart from the first listening position. The acoustic processing device includes a first input unit, a first output unit, and a signal processing circuit. The first input unit receives a first sound source signal to be reproduced at the first listening position. The first sound source signal includes a first left-channel (Lch) signal and a first right-channel (Rch) signal. The first output unit outputs the first sound source signal to a first speaker group including a first speaker disposed near a place of a head of a listener at the first listening position. The signal processing circuit draws out a first common signal common to both the first left-channel signal and the first right-channel signal and outputs the first common signal to the first speaker.

A method of acoustic processing according to the present disclosure is used in a space having a first listening position and a second listening position apart from the first listening position. The space accommodates a first speaker group that includes a first speaker disposed near a place of a head of a listener at the first listening position. The method of acoustic processing includes the steps of acquiring a first sound source signal, drawing out a first common signal, and outputting the first common signal. The step of acquiring the first sound source signal involves acquiring a first sound source signal to be reproduced at the first listening position and that includes a first left-channel signal and a first right-channel signal. The step of drawing out the first common signal involves drawing out a first common signal common to both the first left-channel signal and one right-channel signal. The step of outputting the first common signal involves outputting the first common signal to the first speaker.

A program according to the present disclosure causes an acoustic processing device to perform acoustic processing in a space having a first listening position and a second listening position apart from the first listening position. The space accommodates a first speaker group that includes a first speaker disposed near a place of a head of a listener at the first listening position. The program enables the acoustic processing device to execute the steps of acquiring a first sound source signal, drawing out a first common signal, and outputting the first common signal. The step of acquiring the first sound source signal involves acquiring a first sound source signal to be reproduced at the first listening position and that includes a first left-channel signal and a first right-channel signal. The step of drawing out the first common signal involves drawing out a first common signal common to both the first left-channel signal and the first right-channel signal. The step of outputting the first common signal involves outputting the first common signal to the first speaker.

Note that modifications of aspects of the present disclosure that are modified between methods, devices, systems, recording media (including computer-readable non-transient recording media), computer programs, or the like are also effective as the aspects of the present invention.

An acoustic processing device according to the present disclosure is used in a space where a plurality of listening positions exists. The acoustic processing device enables a listener at each of the listening positions to listen to sound in a more satisfactory environment.

BRIEF DESCRIPTION OF DRAWINGS

FIG. 4 illustrates an example configuration of an in-vehicle audio system including the acoustic processing device according to the exemplary embodiment.

FIG. 5 illustrates an example configuration of an in-vehicle audio system including an acoustic processing device according to an exemplary embodiment.

DESCRIPTION OF EMBODIMENT

Prior to describing an exemplary embodiment according to the present disclosure, disadvantages of the conventional technique will briefly be described. The conventional in-vehicle acoustic processing device reproduces sound signals attenuated at high frequencies and low frequencies. Hence, if the sound sources each have a wide frequency band ranging from low frequencies to high frequencies, the conventional in-vehicle acoustic processing device is disadvantageously unable to exhibit a frequency characteristic intrinsic to the sound sources. In assigning sound signals of a sound source to left/right (LR) channels (distributing components of a sound signal between a left (L) channel and a right (R) channel in a certain proportion to determine a position of the sound signal that is imaged in a right-left direction when the components of the sound signal for the LR channels are simultaneously heard), the conventional in-vehicle acoustic processing device may disadvantageously reproduce the sound signal in an acoustic image different from an original disposition of the sound signal of the sound source since even sound signals at midrange frequencies are conceivably disposed in various ways such as sound signals disposed at a middle position and sound signals disposed at right or left ends. In the description given herein, a "channel" may be hereinafter referred to as "ch". If sounds are simultaneously reproduced in front and rear areas, the conventional in-vehicle acoustic processing device faces a disadvantage that a leakage of one of the sounds in response to an increase in level of that sound in one of the front and rear areas influences audibility of the other sound.

An acoustic processing device according to an exemplary embodiment will now be described with reference to the drawings.

In this exemplary embodiment, an in-vehicle acoustic processing device that is applied to acoustic processing in a space in a cabin of a vehicle will be described. The space in the cabin is an example of a space where a plurality of listening positions exists. Sound reproduced in the space in the cabin is heard by listeners who sit on a front seat and a rear seat in the vehicle.

Figure 1:
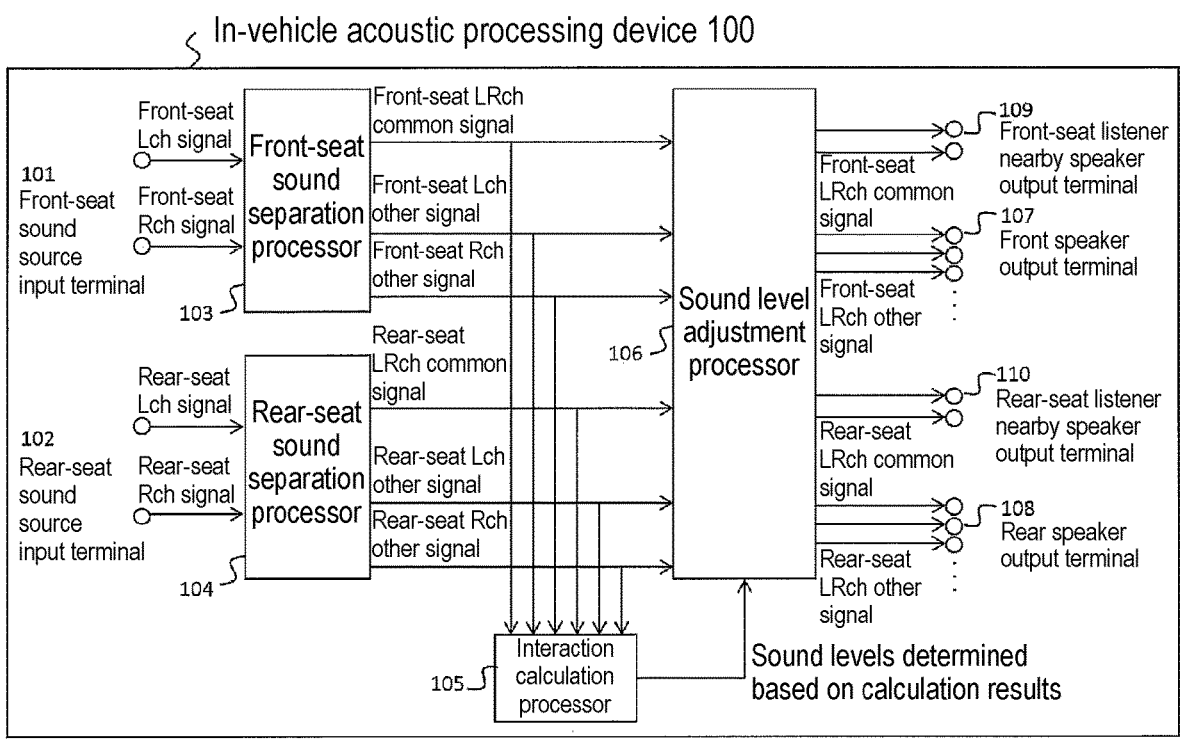
FIG. 1 is a block diagram illustrating a configuration of an acoustic processing device according to an exemplary embodiment.

FIG. 1 is a block diagram illustrating a configuration of in-vehicle acoustic processing device 100 according to an exemplary embodiment.

In-vehicle acoustic processing device 100 is connected with a front-seat sound source device and a rear-seat sound source device (both not shown) through respective front-seat sound source input terminal 101 and rear-seat sound source input terminal 102. In-vehicle acoustic processing device 100 includes front speaker output terminal 107, rear speaker output terminal 108, front-seat listener nearby speaker output terminal 109, and rear-seat listener nearby speaker output terminal 110. Front speaker output terminal 107 is connected with a front speaker (not shown) disposed at a front of a cabin. Rear speaker output terminal 108 is connected with a rear speaker (not shown) disposed at a rear of the cabin. Front-seat listener nearby speaker output terminal 109 is connected with a speaker (not shown) near a head of a listener on a front seat. Rear-seat listener nearby speaker output terminal 110 is connected with a speaker (not shown) near a head of a listener on a rear seat. The front speaker and the speaker near the head of the front-seat listener constitute a front speaker group to reproduce sound source signals for the front seat. Meanwhile, the rear speaker and the speaker near the head of the rear-seat listener constitute a rear speaker group to reproduce sound source signals for the rear seat.

In-vehicle acoustic processing device 100 includes front-seat sound separation processor 103 to separate LR2ch signals for the front seat into a common component and other components, rear-seat sound separation processor 104 to separate LR2ch signals for the rear seat into a common component and other components, interaction calculation processor 105 to calculate reproduction levels of signals, and sound level adjustment processor 106 to adjust sound levels of signals. Front-seat sound separation processor 103, rear-seat sound separation processor 104, interaction calculation processor 105, and sound level adjustment processor 106 constitute a signal processing circuit to process sound source signals input into the input terminals.

Figure 2:
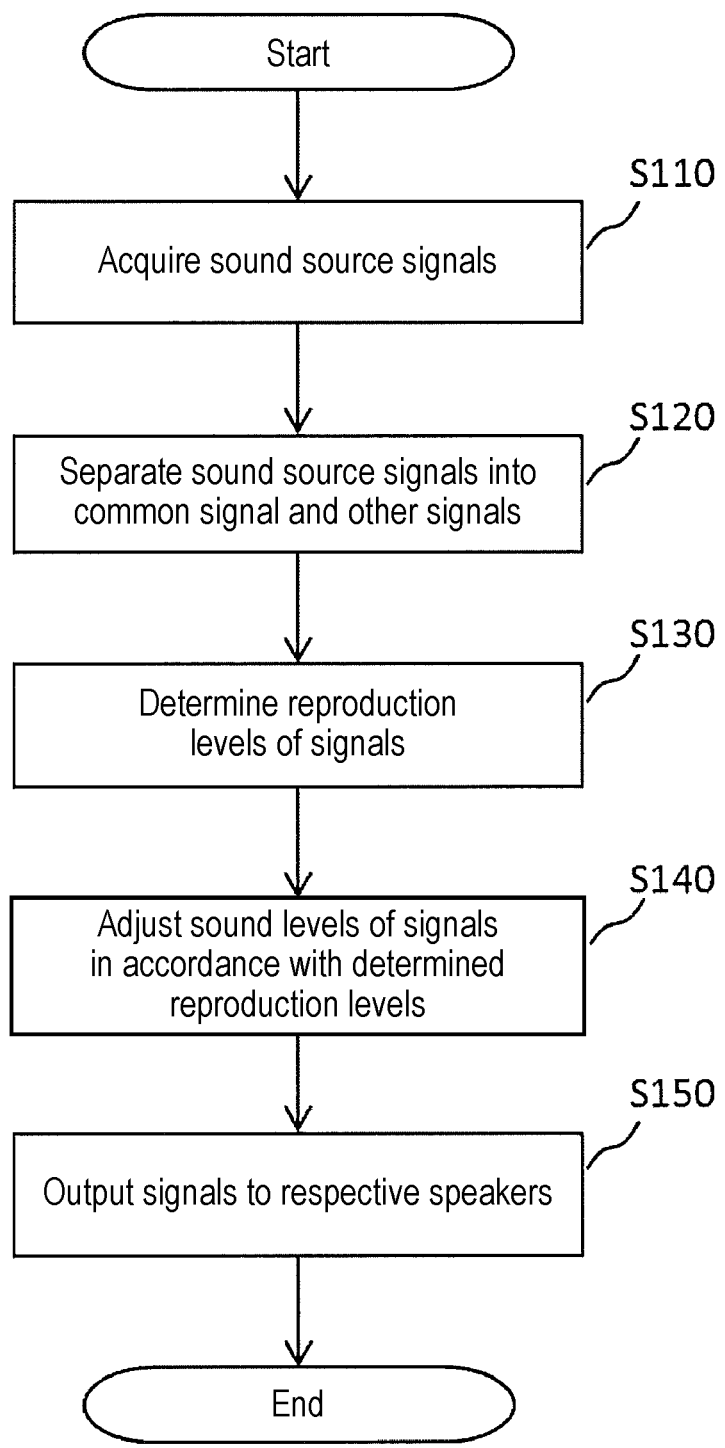
FIG. 2 is a flowchart illustrating a process performed by the acoustic processing device according to the exemplary embodiment.

A process performed by in-vehicle acoustic processing device 100 configured as described above will now be described. FIG. 2 is a flowchart illustrating the process performed by in-vehicle acoustic processing device 100 according to the present exemplary embodiment.

First, in-vehicle acoustic processing device 100 acquires sound source signals reproduced by the front-seat sound source device for the front seat and sound source signals reproduced by the rear-seat sound source device for the rear seat (step S110).

The sound source signals for the front seat include a front-seat left-channel (Lch) signal and a front-seat right-channel (Rch) signal. The sound source signals for the rear seat include a rear-seat left-channel signal and a rear-seat right-channel signal. The front-seat sound source signals reproduced from a compact disc (CD), a digital versatile disc (DVD), or another sound source on the front-seat sound source device are input into front-seat sound separation processor 103 through front-seat sound source input terminal 101. Similarly, the rear-seat sound source signals reproduced by the rear-seat sound source device are input into rear-seat sound separation processor 104 through rear-seat sound source input terminal 102.

Next, front-seat sound separation processor 103 and rear-seat sound separation processor 104 each separate the input sound source signals into a common signal and other signals (step S120). Front-seat sound separation processor 103 separates the front-seat sound source signals into a front-seat left/right-channel (LRch) common signal, a front-seat left-channel other signal, and a front-seat right-channel other signal. Meanwhile, rear-seat sound separation processor 104 separates the rear-seat sound source signals into a rear-seat LRch common signal, a rear-seat left-channel other signal, and a rear-seat right-channel other signal (step S120).

A method of signal separation performed by front-seat sound separation processor 103 and rear-seat sound separation processor 104 may, for example, involve adding the left-channel signal and the right-channel signal of sound source signals together to set a result of the addition as an LRch common signal and subtracting between the left-channel signal and the right-channel signal to set a result of the subtraction as each of other signals. Another method of signal separation may, for example, involve calculating correlation between components of the left-channel signal and the right-channel signal of sound source signals and setting a signal containing the high correlation components as an LRch common signal and a signal containing the low correlation components as each of other signals. If this method is used, correlation between the components of signals in a frequency domain may be calculated for each frequency. This enables signal separation with increased accuracy.

The front-seat LRch common signal, the front-seat left-channel other signal, and the front-seat right-channel other signal output from front-seat sound separation processor 103 are input into interaction calculation processor 105 and sound level adjustment processor 106. The rear-seat LRch common signal, the rear-seat left-channel other signal, and the rear-seat right-channel other signal output from rear-seat sound separation processor 104 are input into interaction calculation processor 105 and sound level adjustment processor 106.

Interaction calculation processor 105 determines reproduction levels of the input signals (step S130). An operation performed by interaction calculation processor 105 will be detailed later.

Sound level adjustment processor 106 adjusts sound levels of the input signals in accordance with the reproduction levels determined by interaction calculation processor 105 (step S140).

The signals adjusted in sound level by sound level adjustment processor 106 are output from the output terminals (namely, front speaker output terminal 107, rear speaker output terminal 108, front-seat listener nearby speaker output terminal 109, and rear-seat listener nearby speaker output terminal 110) to the respective speakers (step S150). The front-seat left-channel other signal and the front-seat right-channel other signal are output to the front speaker via front speaker output terminal 107. The rear-seat left-channel other signal and the rear-seat right-channel other signal are output to the rear speaker via rear speaker output terminal 108. The front-seat LRch common signal is output to the speaker near the head of the listener on the front seat via front-seat listener nearby speaker output terminal 109. The rear-seat LRch common signal is output to the speaker near the head of the listener on the rear seat via rear-seat listener nearby speaker output terminal 110.

Figure 3:
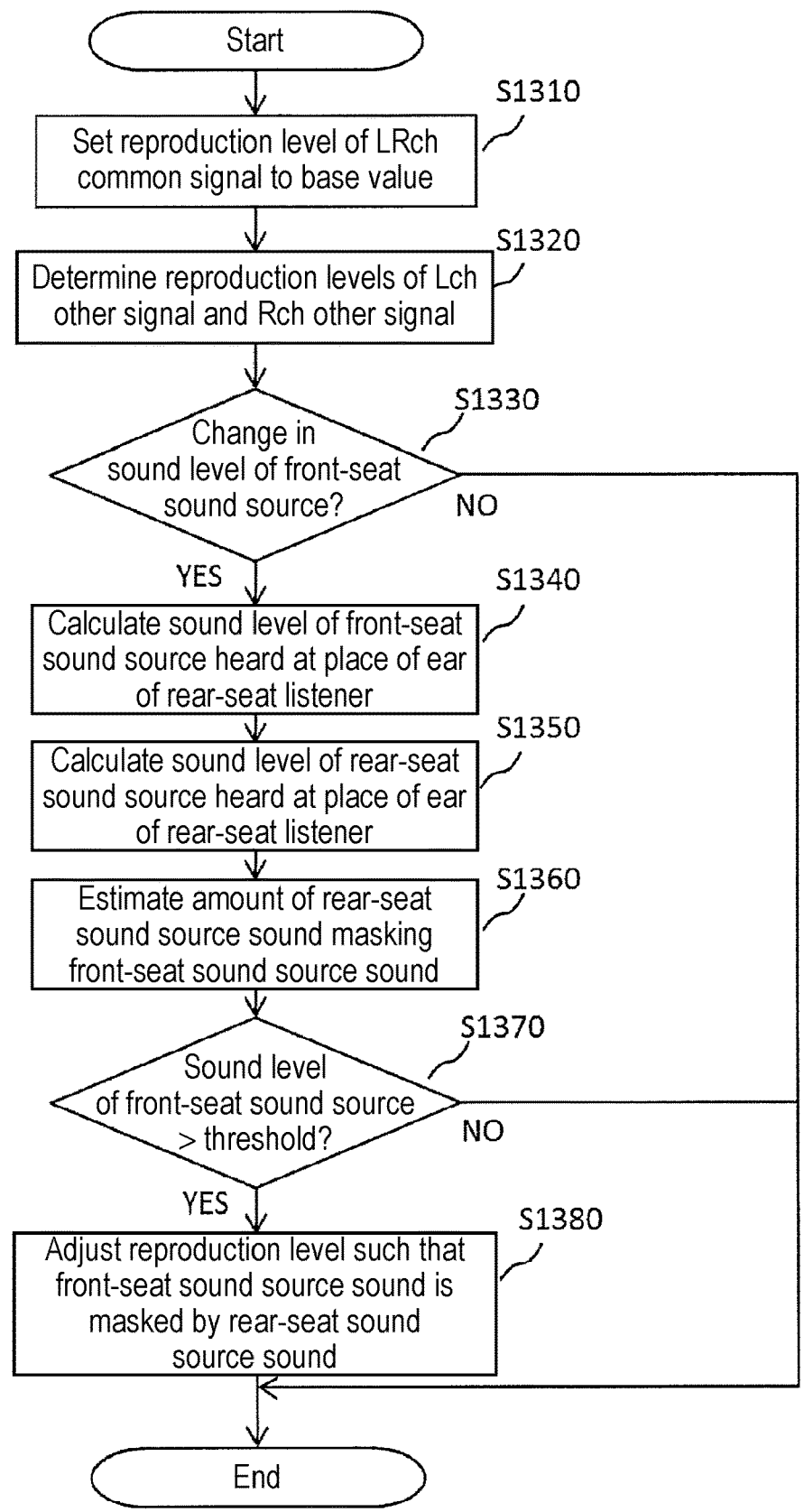
FIG. 3 is a drawing illustrating a process performed by an interaction calculation processor according to the exemplary embodiment.

A process performed by interaction calculation processor 105 to determine reproduction levels of the signals will now be described in detail. FIG. 3 is a flowchart illustrating in detail an operation performed by interaction calculation processor 105 in step S130.

First, the level of the front-seat LRch common signal reproduced on the speaker near the head of the listener on the front seat is set to a base value based on a characteristic of a sound traveling from the speaker near the head of the listener on the front seat to a place of an ear of the listener on the rear seat, in which the characteristic of the sound is measured beforehand (step S1310). The base value is a maximum reproduction level of the front-seat LRch common signal on condition that the signal reaches the ear of the rear-seat listener at a sound level that makes details of sound produced by the signal indistinct at the rear seat. The characteristic of the sound described herein is, for example, a frequency-amplitude characteristic of a sound traveling across a space. A level of sound reproduced by the front-seat LRch common signal at the place of the ear of the rear-seat listener is calculated for each frequency band based on a reproduction level of the front-seat LRch common signal and a frequency-amplitude characteristic of the sound traveling from the speaker near the head of the front-seat listener to the place of the ear of the rear-seat listener. The interaction calculation processor sets the reproduction level of the front-seat LRch common signal such that the calculated sound level equals a sound level that makes details of sound reproduced by the signal indistinct. The sound level that makes sound details indistinct is a sound level less than or equal to a predetermined threshold. The sound level that meets this requirement may be, for example, less than or equal to 25 dB hearing level (HL) in consideration of normal hearing ability of humans. The sound level may be set to a lower level that is less than or equal to 20 dB HL.

Next, the interaction calculation processor determines levels of the front-seat left-channel other signal and the front-seat right-channel other signal reproduced on the nearby front speaker such that a level of sound emitted from the front speaker is in balance with the level of the sound emitted from the speaker near the head of the front-seat listener (step S1320).

Likewise, the level of the rear-seat LRch common signal reproduced on the speaker near the head of the listener on the rear seat is set to a base value based on a characteristic of a sound traveling from the speaker near the head of the listener on the rear seat to a place of an ear of the listener on the front seat, in which the characteristic of the sound is measured beforehand (step S1310). The base value is a maximum reproduction level of the rear-seat LRch common signal on condition that the signal reaches the ear of the front-seat listener at a sound level that makes details of sound reproduced by the signal indistinct at the front seat. The interaction calculation processor determines levels of the rear-seat left-channel other signal and the rear-seat right-channel other signal reproduced on the nearby rear speaker such that a level of sound emitted from the rear speaker is in balance with the level of the sound emitted from the speaker near the head of the rear-seat listener (step S1320).

The acoustic processing device adjusts the reproduction levels of the LRch common signals output from the sound sources as described above and is thereby able to reduce influence of a leakage of the sound from one of the front and rear seats on the other seat.

Next, a description will be given of steps taken in response to a change in the level of sound that is emitted from the sound source played for the front seat or the rear seat. In this example, a description is given of a case in which the sound level of the sound source played for the front seat has changed. For no change in sound level, the acoustic processing device completes settings of reproduction levels ("No" in step S1330). For instance, when the sound level of the sound source for the front seat has risen or when the listener on the front seat has manually increased the level of sound emitted from the front speaker and the speaker near the head of the front-seat listener ("Yes" in step S1330), the leakage of the sound from the front seat to the listener on the rear seat increases.

In response to an increase in sound leakage, the interaction calculation processor adjusts reproduction levels as described below. First, the interaction calculation processor calculates a sound level of the front-seat sound source heard at the place of the ear of the rear-seat listener based on the beforehand measured characteristic of the sound traveling from the speaker near the head of the front-seat listener to the place of the ear of the rear-seat listener and the level of reproduction of signals sent from the front-seat sound source (step S1340). Next, the interaction calculation processor calculates a sound level of the rear-seat sound source heard at the place of the ear of the rear-seat listener based on a characteristic of a sound traveling from the rear speaker and the speaker near the head of the rear-seat listener, which are configured to reproduce signals sent from the rear-seat sound source, to the place of the ear of the rear-seat listener and the level of reproduction of signals sent from the rear-seat sound source (step S1350). Then, based on the calculated sound levels of the sound sources, the interaction calculation processor estimates a masking amount, i.e., to what extent the sound from the front-seat sound source is masked by the sound from the rear-seat sound source at a position of the rear-seat listener (step S1360). The masking amount is, for example, estimated by calculating S−N, i.e., subtracting a level of masking sound (N) from a level of masked sound (S).

Next, the interaction calculation processor determines whether or not the sound level of the front-seat sound source heard at the place of the ear of the rear-seat listener exceeds a threshold set in consideration of the estimated masking amount (step S1370). If the sound level of the front-seat sound source does not exceed the threshold, the interaction calculation processor completes reproduction level settings ("No" in step S1370). If a leakage of the sound emitted from the front-seat sound source occurs in excess of the estimated masking amount ("Yes" in step S1370), the interaction calculation processor increases the level of reproduction of signals sent from the rear-seat sound source to increase a sound level of the rear-seat speaker in an interlocked manner and thereby automatically adjusts the reproduction level such that the sound from the front-seat sound source is masked by the sound from the rear-seat sound source (step S1380). Since the sound level of the front-seat sound source is calculated on the basis of the characteristic of the sound traveling from the speaker near the head of the front-seat listener to the place of the ear of the rear-seat listener in step S1340, the interaction calculation processor adjusts the level of reproduction of signals sent from the rear-seat sound source such that the sound reproduced by at least the front-seat LRch common signal of the signals sent from the front-seat sound source is masked by the sound from the rear-seat sound source in step S1380.

If the sound level of the sound source played for the rear seat has changed on the other way, the interaction calculation processor satisfactorily performs a process in which "front-seat" and "rear-seat" are replaced with each other in steps S1330 to S1380. In other words, in the case of a leakage of the sound transmitted from the rear-seat sound source into a position of the front-seat listener, the interaction calculation processor increases the level of reproduction of signals sent from the front-seat sound source to increase a sound level of the front-seat speaker in an interlocked manner and thereby automatically adjusts the reproduction level such that the sound from the rear-seat sound source is masked by the sound from the front-seat sound source.

As described above, the interaction calculation processor is designed to automatically adjust the sound level of the rear-seat sound source in response to a change in the sound level of the front-seat sound source, or in contrast, automatically adjust the sound level of the front-seat sound source in response to a change in the sound level of the rear-seat sound source.

If a user is allowed to specify priorities on seats, the interaction calculation processor can differentiate between the front and the rear seats in items such as default sound level at startup, a balance in sound level between the front and the rear seats, or a balance between automatic increase amounts in the sound level of one of the sound sources in response to an increase in the sound level of the other sound source. In one example, a description is given of a case in which a priority is given to the rear seat. In this case, the front seat is entitled to an allowance of a predetermined amount of sound leakage for the amount of the sound from the front-seat sound source masking the sound from the rear-seat sound source. In other words, the interaction calculation processor sets the threshold used in determining satisfaction of the condition in step S1370 described above to a greater value relative to the masking amount. This arrangement allows a higher level of sound at the rear seat than at the front seat when the sound levels of the front- and rear-seat sound sources are adjusted relative to each other as described above.

After the determination of reproduction levels by interaction calculation processor 105, sound level adjustment processor 106 adjusts sound levels of the signals. The signals adjusted in sound level by sound level adjustment processor 106 are output as sounds from the speakers corresponding to the respective signals. In other words, the front-seat LRch common signal is output from the speaker near the head of the listener on the front seat via front-seat listener nearby speaker output terminal 109. The front-seat left-channel other signal and the front-seat right-channel other signal are output from the front speaker via the front speaker output terminal. The rear-seat LRch common signal is output from the speaker near the head of the listener on the rear seat via rear-seat listener nearby speaker output terminal 110. The rear-seat left-channel other signal and the rear-seat right-channel other signal are output from the rear speaker via rear speaker output terminal 108. The process performed by in-vehicle acoustic processing device 100 according to the present exemplary embodiment has been described above.

The above-described speaker near the listener on each of the seats may be disposed near a headrest at the position of a listener or may be a ceiling speaker near the position of a listener. As for a number of speakers, two speakers may be disposed at right and left sides of the head of each listener, or one speaker may be roughly above a cross-sectional center line along a front and a rear of the head of each listener. The front- and rear-seat sound sources may be sound sources for LR2ch, or 5.1ch or 7.1ch sound sources. For LR2ch sound sources, LR common components sent from the sound sources are output from the speakers near the listeners on the respective seats. For 5.1ch or 7.1ch sound sources, center ch components in addition to the LR common components are output from the speakers near the listeners on the respective seats.

In the exemplary embodiment described above, the front-seat sound source and the rear-seat sound source are played for the front seat and the rear seat. However, a sound source may be played for only one of front and rear seats. In this case, interaction calculation processor 105 may perform a process involving only setting the level of reproduction of the LRch common signals sent from the played sound source to a base value and determining levels of reproduction of left-channel other signals and right-channel other signals in response to the set reproduction level of the LRch common signals. In other words, the interaction calculation processor may perform only steps S1310 and S1320 in FIG. 3.

The LRch common components of a sound source including left-channel signals and right-channel signals contain many sound signals that attention is readily focused on and that are expected to be disposed at a middle, such as vocal sounds in music and actors' lines in movies. Even if the sound source is played for a specific listening position, the LRch common components in particular readily receive attention as a sound leakage at another listening position where the sound source is not originally expected to be heard. To solve this problem, in-vehicle acoustic processing device 100 according to the present exemplary embodiment draws the LRch common components from sound source signals and reproduces the common components from the speaker near the head of each seat at a sound level that is lower than that at which sound signals are normally reproduced from nearby speakers. This configuration reduces the level of sound that leaks into other seats.

While the in-vehicle acoustic processing device reproduces sound signals of a sound source at a first listening position at a decreased level to reduce the level of sound that leaks into a second listening position, the sound signals of the sound source are reproduced without problems at the first listening position where the sound source is originally expected to be heard. In other words, the in-vehicle acoustic processing device reproduces the LRch common components from the speakers near the heads of listeners, which are nearer to ears of the listeners than the nearby speakers are, and thereby enables the listeners to listen to the sound components even at a sound level that is lower than that at which sound components are normally reproduced from remote speakers such as door speakers of vehicles. As for disposition of an acoustic image in a right-left direction, the in-vehicle acoustic processing device draws components of the sound source that are expected to be disposed at a middle and thus reproduces the components from the two speakers at right and left sides of the head of each listener at equal sound levels or from the one speaker above the cross-sectional center line along the front and the rear of the head of each listener to dispose the components of the sound source at the middle in the same way as an original acoustic image formed by the sound source.

As described above, the in-vehicle acoustic processing device according to this exemplary embodiment reproduces the LRch common components of the sound source from the speaker disposed near the place of the head of each listener at the first listening position and thereby reduces the leakage of sound into the second listening position. At the same time, the in-vehicle acoustic processing device is able to reproduce the common components at a satisfactory sound level and dispose a satisfactory acoustic image at the first listening position where the sound source is originally expected to be heard. This configuration allows the in-vehicle acoustic processing device to be used in a space where a plurality of listening positions exists and enables a listener at each of the listening positions to listen to sound in a more satisfactory environment.

In one example of sound level adjustment, sound signals of a sound source are reproduced only at a single listening position. A reproduction level of the sound signals of the sound source is adjusted to a level that makes details of sound reproduced by the LRch common components indistinct at other listening positions. This configuration allows a reduction in the leakage of sound into the other listening positions.

In another example of sound level adjustment, sound signals of different sound sources are reproduced at a plurality of respective listening positions. In this case, reproduction levels of the sound signals of the sound sources are mutually adjusted such that sound at each of the listening positions mask the sound signals of the sound sources reproduced and sent from the other listening positions. Even if the sound level of one of the sound sources has changed, the interaction calculation processor adjusts the reproduction levels of the sound signals of the other sound sources in consideration of masking by the other sound sources. This configuration allows a reduction in the leakage of sound from one of the listening positions into the other listening positions mutually.

All or some components of the device described above or all or some of the functional blocks illustrated in the functional block diagram of FIG. 1 may be formed of one or more electronic circuits including a semiconductor device, a semiconductor integrated circuit (IC) or a large-scale integrated circuit (LSI). The LSI or the IC may be integrated into one chip or be formed of a plurality of combined chips. Although the term LSI or IC is used herein, the term may be changed according to a degree of integration. Sometimes the term system LSI, very large-scale integration (VLSI), or ultra-large-scale integration (ULSI) is used.

All or some functions or processes performed by the device described above may be implemented by a program on a computer. The computer includes a central processing unit (CPU), and the program is recorded on a non-transient recording medium such as a read only memory (ROM), an optical disk, and a hard disk drive.

The CPU calls and executes the program stored in the non-transient recording medium, thereby implementing each of the functions or the processes.

The in-vehicle acoustic processing device applied to acoustic processing in the space in the cabin of the vehicle has been described above as an example to illustrate an acoustic processing device according to the present exemplary embodiment.

With reference to FIGS. 4 and 5, an example configuration of an in-vehicle audio system including the in-vehicle acoustic processing device according to the present disclosure will now be described.

In-vehicle audio systems illustrated in FIGS. 4 and 5 have sound source devices 201, 301, front-seat occupant displays 202, 302, rear-seat occupant displays 203, 303, front speakers 204, 304, rear speakers 205, 305, speakers 206, 306 near heads of listeners on front seats, speakers 207, 307 near heads of listeners on rear seats, and subwoofers 208, 308, respectively. These devices of the in-vehicle audio systems include front-seat sound source devices such as audiovisual devices designed to play television (TV) programs or DVDs or audio devices designed to play radio programs or CDs, rear-seat sound source devices similar to the front-seat sound source devices, devices used to input commands to these sound source devices, and sound processing units including the in-vehicle acoustic processing devices according to the present disclosure.

Front speakers 204, 304 and rear speakers 205, 305 are each made up of a pair of speakers having LRch. Front speakers 204, 304 each include a speaker on a right front door and a speaker on a left front door to reproduce right-channel front signals and left-channel front signals, respectively and may additionally have a speaker roughly above a right end of an instrument panel and a speaker roughly above a left end of the instrument panel to reproduce the right-channel and the left-channel front signals, respectively. Rear speakers 205, 305 each include a speaker on a right rear door and a speaker on a left rear door to reproduce right-channel rear signals and left-channel rear signals, respectively and may additionally have a speaker on a right side of a C-pillar (right and left pillars rearward of the rear seat) and a speaker on a left side of the C-pillar to reproduce the right-channel and the left-channel rear signals, respectively.

For a three-row vehicle, the in-vehicle audio system may further include speakers on right and left wall surfaces at a third row seat, or a speaker on a right side of a D-pillar (right and left pillars rearward of the third row seat) and a speaker on a left side of the D-pillar, to reproduce the right-channel and the left-channel rear signals, respectively. Speakers 206, 306 near the heads of listeners on the front seats and speakers 207, 307 near the heads of listeners on the rear seats are each made up of two speakers disposed at right and left sides of the head of each listener (206, 207) or one speaker roughly above a cross-sectional center line along a front and a rear of the head of each listener (306, 307). Subwoofers 208, 308 are each disposed in a rear tray (208) or disposed with a box inside a luggage room (308), for example.

The front-seat sound source device and the rear-seat sound source device are disposed inside a dashboard. Alternatively, the front-seat sound source device is disposed inside a dashboard, whereas the rear-seat sound source device is additionally disposed at a place that allows control of the sound source device from the rear row seat. Examples of the devices used to input commands to these sound source devices include touch panels used to control players or other such machines and remote controllers. The sound processing unit may be disposed inside the dashboard together with the above-described player or other such machines or be built into an amplifier or another audio system component installed separately from the player or other such machines. The sound processing unit may be disposed as a single unit dedicated to sound processing. Front-seat occupant displays 202, 302 are each disposed such that a display plane of the display faces an occupant at the front seat. Rear-seat occupant displays 203, 303 are each disposed on a ceiling between the front and the rear seats (203) or disposed behind the front seat such that a display plane of the display faces an occupant at the rear seat (303).

If different sound sources are played for the front and the rear seats, subwoofers 208, 308 are used to reproduce sound signals of the respective rear-seat sound sources.

In the system described above, the in-vehicle acoustic processing device according to the present disclosure in the sound processing unit separates signals output from the front-seat sound source device and the rear-seat sound source device into signal components and adjusts the signal components in sound level. After that, the signal components from the sound source for the front seat are output to front speakers 204, 304 and speakers 206, 306 near the heads of listeners on the front seat. At the same time, video signals, if attached to the sound signals, are output to front-seat occupant displays 202, 302. Similarly, the signal components from the sound source for the rear seat are output to rear speakers 205, 305, speakers 207, 307 near the heads of listeners on the rear seat, and subwoofers 208, 308. At the same time, video signals, if attached to the sound signals, are output to rear-seat occupant displays 203, 303.

INDUSTRIAL APPLICABILITY

An acoustic processing device according to the present disclosure is useful as an in-vehicle acoustic processing device that performs acoustic processing in an environment where different sound sources are simultaneously played for a plurality of areas in a vehicle cabin.

REFERENCE MARKS IN THE DRAWINGS

100: in-vehicle acoustic processing device
101: front-seat sound source input terminal
102: rear-seat sound source input terminal
103: front-seat sound separation processor
104: rear-seat sound separation processor
105: interaction calculation processor
106: sound level adjustment processor
107: front speaker output terminal
108: rear speaker output terminal
109: front-seat listener nearby speaker output terminal
110: rear-seat listener nearby speaker output terminal
201,301: sound source device
202,302: front-seat occupant display
203,303: rear-seat occupant display
204,304: front speaker
205,305: rear speaker
206,306: speaker near head of listener on front seat
207,307: speaker near head of listener on rear seat
208,308: subwoofer

The invention claimed is:

1. An acoustic processing device that performs acoustic processing in a space having a first listening position and a second listening position apart from the first listening position, the acoustic processing device comprising:
a first input unit to receive a first sound source signal that be reproduced at the first listening position, the first sound source signal including a first left-channel signal and a first right-channel signal;
a first output unit to output the first sound source signal to a first speaker group including a first main speaker and a first sub-speaker; and
a signal processing circuit,
wherein the signal processing circuit
draws out a first common signal common to both the first left-channel signal and the first right-channel signal and a first other signal; and
outputs the first common signal to the first main speaker and outputs the first other signal to the first sub-speaker, and
wherein the first main speaker is nearer to the first listening position than the first sub-speaker is, and
wherein
the first common signal contains a signal having high correlation between the first left-channel signal and the first right-channel signal, and
the first other signal contains a signal having low correlation between the first left-channel signal and the first right-channel signal.

2. The acoustic processing device according to claim 1, wherein the signal processing circuit adjusts a reproduction level of the first sound source signal such that a level of sound reproduced on the first main speaker and heard at the second listening position is less than or equal to a predetermined threshold.

3. The acoustic processing device according to claim 1, further comprising:
a second input unit to receive a second sound source signal that be reproduced at the second listening position; and
a second output unit to output the second sound source signal to a second speaker group,
wherein the signal processing circuit adjusts a relationship between reproduction levels of the first sound source signal and the second sound source signal such that sound reproduced on the second speaker group masks sound reproduced and sent from the first speaker.

4. The acoustic processing device according to claim 3, wherein
the second sound source signal includes a second left-channel signal and a second right-channel signal,
the second speaker group includes a second main speaker located near the second listening position, and
the signal processing circuit
draws out a second common signal common to both the second left-channel signal and the second right-channel signal and
outputs the second common signal to the second main speaker.

5. The acoustic processing device according to claim 4, wherein the signal processing circuit adjusts the relationship between the reproduction levels of the first sound source signal and the second sound source signal such that sound reproduced on the first speaker group masks sound reproduced and sent from the second speaker.

6. The acoustic processing device according to claim 1, wherein
the space is a cabin of a vehicle,
the first listening position is near an upper part of one of a front seat and a rear seat in the vehicle, and
the second listening position is near an upper part of another of the front seat and the rear seat.

7. The acoustic processing device according to claim 6, wherein the first main speaker is located near a headrest of the front seat or the rear seat.

8. The acoustic processing device according to claim 6, wherein the first main speaker is located on the ceiling directly above a headrest of the front seat or the rear seat.

9. A method of acoustic processing used in a space having a first listening position and a second listening position apart from the first listening position and the space accommodating a first speaker group that includes a first main speaker and a first sub-speaker, the method of acoustic processing comprising:
acquiring a first sound signal including a first left-channel signal and a first right-channel signal and the first sound signal being a sound source signal to be reproduced at the first listening position,
drawing out the first common signal common to both the first left-channel signal and the first right-channel signal and a first other signal, and
outputting the first common signal to the first main speaker and outputting the first other signal to the first sub-speaker,
wherein the first main speaker is nearer to the first listening position than the first sub-speaker is, and
wherein
the first common signal contains a signal having high correlation between the first left-channel signal and the first right-channel signal, and
the first other signal contains a signal having low correlation between the first left-channel signal and the first right-channel signal.

10. A non-transitory machine-readable recording medium that stores a program causes an acoustic processing device to execute a method of acoustic processing used in a space having a first listening position and a second listening position apart from the first listening position and the space accommodates a first speaker group that includes a first main speaker and a first sub-speaker, the method of acoustic processing comprising:
acquiring a first sound signal including a first left-channel signal and a first right-channel signal and the first sound signal being a sound source signal to be reproduced at the first listening position,
drawing out the first common signal common to both the first left-channel signal and the first right-channel signal and a first other signal, and
outputting the first common signal to the first speaker and outputting the first other signal to the first sub-speaker,
wherein the first main speaker is nearer to the first listening position than the first sub-speaker is, and
wherein
the first common signal contains a signal having high correlation between the first left-channel signal and the first right-channel signal, and
the first other signal contains a signal having low correlation between the first left-channel signal and the first right-channel signal.

* * * * *